United States Patent [19]
Gotoh et al.

[11] Patent Number: 5,514,440
[45] Date of Patent: May 7, 1996

[54] OPTICAL RECORDING MEDIUM AND OPTICAL RECORDING METHOD USING THE SAME

[75] Inventors: Hironori Gotoh; Kiichi Ueyanagi, both of Ebina, Japan

[73] Assignee: Fuji Xerox Co., Ltd., Tokyo, Japan

[21] Appl. No.: 951,770

[22] Filed: Sep. 28, 1992

[30] Foreign Application Priority Data

Sep. 27, 1991 [JP] Japan ..................... 3-274977

[51] Int. Cl.$^6$ ............... B32B 3/02; G11B 5/66; B05D 5/06; G03C 5/00
[52] U.S. Cl. ............. 428/64.2; 428/64.4; 428/684 ML; 428/684 XS; 428/900; 427/162; 368/284; 368/288; 430/321; 430/346; 430/495.1; 430/496; 346/137; 346/135.1
[58] Field of Search ............ 428/694 ML, 694 XS, 428/900, 64.2, 64.4; 346/137, 135.1; 369/284, 288; 430/321, 346, 495, 496; 427/162

[56] References Cited

U.S. PATENT DOCUMENTS 4,388,400  6/1983  Tabei et al. ..................... 430/346
4,821,050  4/1989  Yabe et al. ..................... 346/137

FOREIGN PATENT DOCUMENTS 3-96389  4/1991  Japan .

*Primary Examiner*—Leszek Kiliman
*Attorney, Agent, or Firm*—Oliff & Berridge

[57] ABSTRACT

An optical recording medium is disclosed, which comprises a substrate having thereon a recording layer which is capable of forming regions having an increased reflectivity by spinodal decomposition of the recording layer upon application thereto of energy of a threshold value or higher. Writing of information is achieved by irradiating the recording layer with no phase separation caused by spinodal decomposition with an energy beam having an intensity causing spinodal decomposition-induced phase separation in accordance with the information to be written. Reading of the information, on the other hand, is achieved by irradiating the recording layer with phase separation caused by spinodal decomposition with an energy beam having an intensity causing no spinodal decomposition-induced phase separation. The medium and the recording system using the same exhibit high sensitivity, high reflectivity, and high contract and conform to the CD or LD standard.

13 Claims, 9 Drawing Sheets

| RECORDING MODE |
|---|
| ▨ HIGH TO LOW<br>(NUCLEATION & GROWTH:BINORDAL DECOMPOSITION) |
| ▨ LOW TO HIGH<br>(SPINODAL DECOMPOSITION) |

OPTICAL RECORDING MEDIUM AND OPTICAL RECORDING METHOD USING THE SAME

FIELD OF THE INVENTION

This invention relates to an optical recording medium comprising a substrate having thereon a recording layer whose optical properties are changeable on light or heat application, etc. and capable of recording, reproduction and erasion of information by making use of the changes of optical properties. In particular, it relates to an optical recording medium which utilizes a phase separation phenomenon that an initial phase of the material system of a recording layer is separated into two phases different in composition upon receipt of a thermal process in conformity with the respective material, and to an optical recording method using such an optical recording medium.

BACKGROUND OF THE INVENTION

The technical advancement of optical recording started from establishment of a theory of reading out. Based on the theory, read only memory discs, i.e., CD and LD, have been developed. Thereafter, an optical recording system enabling a user to write only once, called a write once (WO) type, has been developed. The WO type recording system typically includes a pit system and a bubble system.

Lately, a magneto-optic (MO) system and a phase transition system have been proposed as an erasable recording system. For the time being, efforts are now being made to add improvements and to put them to practical use.

These optical recording techniques have their own merits and demerits as described below.

The pit type WO recording system is easy to carry out with a good choice of material and provides a high recording contrast. However, should the pits be irregular in shape, the S/N ratio would be decreased. To avoid this, it is necessary to choose a material which is capable of forming uniform and regular pits. In the case of LD, it must have an air-sandwiched structure, requiring special techniques for the production. While the pits themselves are free from deterioration, stability of the recording film itself needs due consideration. Since a single material is incapable of maintaining sufficient stability, a plurality of materials are usually used in combination in the form of a mixture or an alloy. In such a combination of materials, Te is often used as a matrix. However, even the combination of materials, whether as a mixture or an alloy, cannot get rid of the susceptibility to oxidation during long-term use and has poor durability. Besides, the process for producing the pit type recording material is complicated and is also accompanied with a variation among lots. As a matter of course, the pit type system is incapable of erasion.

The bubble type WO recording system comprises applying heat of a laser beam to the plastic material constituting a substrate to generate a gas which causes plastic deformation of an alloy, e.g., NiTi, to form bubbles. The problem of this system is poor stability of the bubbles themselves. Similarly to the pit type system, the bubble type system is incapable of erasion.

The phase transition type recording system generally utilizes phase transition between an amorphous phase and a crystal phase. As compared with the pit type system, this system is free from S/N deterioration caused by protuberance of pits, but the contrast obtained by the phase transition is not so appreciable as reached by pits and meets difficulty in assuring a high S/N ratio. Stability of the metastable amorphous phase gives rise to another problem. Stability of the constituent materials themselves, mainly comprising a chalcogenide (e.g., Te, Se), is also insufficient. Besides, some of these materials need considerable time for transition to a crystal phase, failing to exhibit satisfactory performance. Notwithstanding these disadvantages, there have been found some materials which achieve erasion utilizing amorphous/crystal phase transition, and, when compared with the MO system hereinafter described, the phase transition system has a great merit of overwriting with one beam. Therefore, this system is expected to develop as a promising erasable system.

The MO recording system is a system in which changes of angle of Kerr rotation are detected and converted to signals. Since the angle of rotation is small for obtaining a high S/N ratio, various manipulations should be added to the construction of the MO recording medium. In addition, the medium generally contains a metal susceptible to oxidation, such as Tb or Fe, which also makes the medium construction complicated, thus making the process for production difficult. Nevertheless, many manufacturers have devoted themselves studying for improving stability or S/N because of the erasability of this system.

Under these circumstances, the inventors have proposed an optical recording system utilizing phase separation as disclosed in JP-A-3-96389 (the term "JP-A" as used herein means an "unexamined published Japanese patent application"). According to this system, a laser beam of higher power is irradiated onto a recording layer to produce a quenching effect. The quenching effect induces spinodal decomposition to change reflectivity of the recording layer from low to high (low-to-high mode). On the other hand, a laser beam of lower power is irradiated to induce phase separation due to nucleation and growth of the nuclei (binordal decomposition) to change the reflectivity from high to low (high-to-low mode). The difference between the higher power and the lower power makes erasion feasible between spinodal decomposition and binordal decomposition. The first merit of this recording system is long-term stability owing to the use of polycrystalline oxides which are less susceptible to changes with time, such as a change in structure or oxidation. The second merit is a very high reaction rate. The third merit is that the oxide materials used have a high light transmission in the visible to infrared region, affording great freedom in optical and thermal designing of a multi-layered structure for optical and thermal optimization and, in addition, making it possible to increase the contrast of reproduced signals.

As stated above, a number of optical recording systems or media have so far been proposed. Of these media, CD and LD have been supplied in quantity and at low cost as read only memory (ROM) media and have been of wide prevalence owing to the strict standardization. On the other hand, while the WO type and erasable type media have also been and are being standardized, they are not so popular as CD or LD partly because of the radical technical innovations now being made in so many ways by so many makers and partly because of the expensiveness of the media themselves and the drives therefor.

These various recording systems developed to date do not always have interchangeability. Under the present situation, they are produced through the respective process and used on the respective drive. That is, interchangeability among most of different drives, discs, and production processes are extremely poor, which will cost both users and makers and give inconvenience on practical use, thus being a cause of delay of prevalence.

As an approach for eliminating the lack of interchangeability, WO type or erasable recording media having the same format as CD or LD have been studied, and some of them have been put to practical use. The CD or LD format essentially sets the reflectivity at 70% or higher. However, with the initial reflectivity being set at 70% or more, the absorbance is 30% at the highest, resulting in considerable deterioration in sensitivity.

In other words, although a WO system can be achieved by setting the initial reflectivity at 70% or more in conformity with the CD format, the sensitivity of the WO type medium cannot be set high without the cost of stability of the medium. When applied to the LD format, writing requires a greater laser power than used for CD because the linear velocity reaches at least 10 to 20 times that of CD. Accordingly, the absorbance must be set high at the cost of the reflectivity, resulting in deviation from the standard and impairment of interchangeability with an LD player. Thus, achievement of a WO system according to the CD or LD format is accompanied by difficulty in medium designing from the standpoint of reflectivity and sensitivity.

SUMMARY OF THE INVENTION

An object of the present invention is to provide a write type optical recording medium which has high sensitivity, high reflectivity and high contrast and is therefore conformable to the CD or LD format and an optical recording medium using the same.

Another object of the present invention is to provide an optical recording medium and method in which loss of an energy beam due to reflection on writing can be minimized to improve energy utilization.

The inventors have studied application of a phase separation type optical recording system to the current CD or LD format and, as a result, found a new system achieving high sensitivity, high reflectivity and high contrast in conformity to the CD or LD standard.

The present invention relates to an optical recording medium comprising a substrate having thereon a recording layer which is capable of forming regions having an increased reflectivity by spinodal decomposition of the recording layer upon application thereto of energy of a threshold value or higher and which has a maximum reflectivity of at least 65% when the energy of 196 KHz is applied thereto, wherein an amplitude of vibration in reflectivity of the recording layer upon application of the energy of 720 KHz is 0.3 to 0.6 times that of said maximum reflectivity and an initial reflectivity of the recording layer is not more than 0.4 times that of said maximum reflectivity.

The present invention also relates to an optical recording method comprising writing and reading information by application of energy to a phase-separable recording layer provided on a substrate, wherein the writing is effected by applying energy having an intensity in conformity with the information to form recording bits in the form of regions having an increased reflectivity due to spinodal decomposition of the recording layer, and the reading is effected by applying energy having an intensity not to cause spinodal decomposition of the recording layer.

DETAILED DESCRIPTION OF THE INVENTION

Figure 1:
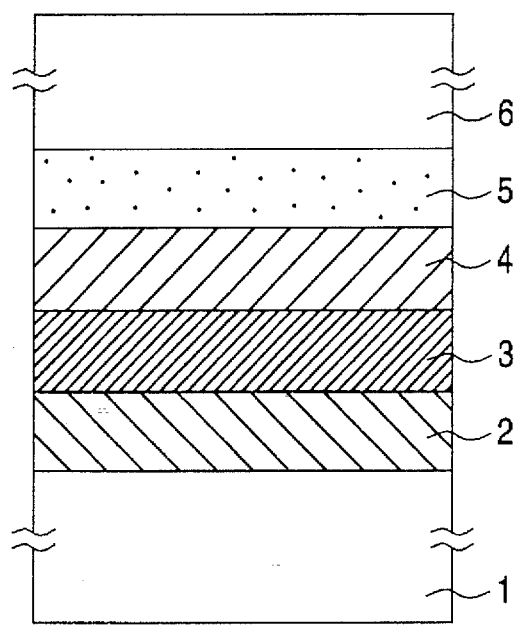
FIG. 1 is a schematic cross section of one preferred embodiment of the optical recording medium according to the present invention.

The optical recording medium of the present invention comprises a substrate having thereon a recording layer which undergoes phase separation on irradiation of an energy beam, such as light, and the recording layer is comprised of a material having a composition capable of spinodal decomposition. The recording layer having such a composition can be obtained by choosing an appropriate recording material capable of phase separation on application of light, heat, etc., drawing up a phase diagram of the material in a usual manner, and deciding the composition of the material according to the spinodal line of the phase diagram.

The recording materials subject to phase separation by application of light, heat, etc. which can be used in the present invention include alloys, such as PbTe-GeTe, Au-Pt, Au-Ni, PbS-PbTe, $GeSe_2$-GeSe, and As-Ge-Te; mixed oxides, such as $Li_2O$-$SiO_2$, $Na_2O$-$SiO_2$, BaO-$SiO_2$, $Al_2O_3$-$SiO_2$, $B_2O_3$-$SiO_2$, $Li_2O$-$B_2O_3$, $Na_2O$-$B_2O_3$, $K_2O$-$B_2O_3$, $Rb_2O$-$B_2O_3$, $Cs_2O$-$B_2O_3$, PbO-$B_2O_3$, $ZrO_2$-$ThO_2$, CaO-$SiO_2$, $B_2O_3$-PbO, $B_2O_3$-$V_2O_5$, $SnO_2$-$TiO_2$, NiO-CoO, $Al_2O_3$-$Cr_2O_3$, $SiO_2$-$Al_2O_3$, $ZnWO_4$-$MnWO_4$, $CaWO_4$-$NaSm(WO_4)_2$, $CaWO_4$-$Sm_2(WO_4)_3$, $MnMoO_4$-$ZnMoO_4$, $Fe_2TiO_4$-$Fe_3O_4$, $Ca_3Cr_2Si_3O_{12}$-$Ca_3Fe_2Si_3O_{12}$, $65MgSiO_3$/$35FeSiO_3$-$CaSiO_3$, $LiAl_6O_8$-$LiFe_5O_8$, $NaAlSi_3O_8$-$KAlSi_3O_8$, and $Na_2O$-$B_2O_3$-$SiO_2$; mixed halides, such as LiCl-NaCl, KCl-NaCl, CsCl-TlCl, $CaCl_2$-$MnCl_2$, $CaCl_2$-$SrCl_2$, LiBr-AgBr, AgBr-NaBr, KBr-NaBr, TlBr-CsBr, KI-NaI, NaI-$CaI_2$, $(GaI_2)_2$-$NaGaI_4$, $(GaI_2)_2$-$KGaI_4$, $(GaI_2)_2$-$RbGaI_4$, and $GaAlI_4$-$Ga_2I_4$; antimony oxides; unfixed ratio compounds of oxides or halides, such as $CeO_n$, Bi-$Bi_2O_3$, and $CaCO_3$-$MnCO_3$; and organic materials, such as polymer blends so-called "polymer alloys" which undergo spinodal decomposition, and random copolymers, alternating copolymers, block copolymers or graft copolymers which undergo microphase separation.

Of these materials, antimony oxides are preferably used as a recording material. More preferred are those having a composition represented by $SbO_x$ wherein x is a real number of from 0 to 1.1, or from 1.5 to 2.3, most preferably x is a real number of from 0.3 to 0.6, or from 1.8 to 2.1.

According to the present invention, materials which undergo binordal decomposition can also be used as a recording material as long as they undergo spinodal decomposition upon rapid quenching following heating on writing.

In order to ensure spinodal decomposition or to facilitate the rapid quenching of the recording materials, a metal layer is preferably provided in the optical recording medium of the present invention. Thus, the optical recording medium preferably has such a multi-layered structure in which the recording layer having been heated on writing may be rapidly quenched. Such a structure can be obtained by providing a reflecting quenching layer made of a material having a high specific heat and a high heat conductivity (i.e., a high heat absorbance), such as aluminum, gold, or copper, with which the recording layer may be quenched after completion of the energy beam irradiation. Aluminum has high reflectivity with respect to laser beams and has substantially no wavelength dependence concerning the change in reflectivity so that it allows use of short-wavelength laser beam. Further, it is inexpensive. Therefore, aluminum is very suitable as a cooling and reflecting material for the purpose.

The reflecting quenching layer is preferably provided on the upper side of the recording layer via an upper dielectric layer comprising a protective material selected from metal oxides, nitrides or fluorides having a higher melting point than the recording material constituting the recording layer and having good wet to the molten recording material. Other optional layers may be provided on the upper and/or lower side of the recording layer. For example, a lower dielectric layer similar to the above-mentioned upper dielectric layer may be provided on the lower side of the recording layer, or a protective layer for protection of the reflecting quenching layer, such as a protective layer made of an ultraviolet curing resin, an acrylic resin, a polycarbonate resin, or an epoxy resin, may be provided on the surface of the reflecting quenching layer. Further, a high refractive layer made of, e.g., ZnS, may be provided on the recording layer for the purpose of increasing the amount of the reflected light from the recording layer.

Specific examples of the layer structure of the optical recording medium include substrate/lower dielectric layer/recording layer/upper dielectric layer/reflecting quenching layer/ultraviolet cured resin layer; substrate/recording layer/upper dielectric layer/reflecting quenching layer/ultraviolet cured resin layer; and substrate/lower dielectric layer/recording layer/reflecting quenching layer/ultraviolet cured resin layer.

The recording layer in the multi-layer structure must have a relatively low initial reflectivity, i.e., from about 30 to 50%, and preferably from 40 to 50%.

The multi-layer structure design inclusive of the thickness of each constituent layer is decided through simulation with a variety of recording materials and the reflectivity and thickness of each constituent layer as variables.

The optical recording medium of the present invention can be produced by conventionally known techniques. For example, formation of a recording layer on a substrate, formation of a dielectric layer from a protective material, or formation of a reflecting quenching layer from a material of high heat absorbance can be achieved by thermal evaporation, ion plating, reactive sputtering, chemical vapor deposition (CVD), ion aid deposition (IAD), molecular beam epitaxy (MBE), direct polymerization in situ, coating of a secondary compound having dissolved therein a copolymer, and the like.

Writing of information on the optical recording medium of the present invention can be achieved by irradiating the recording layer with no phase separation caused by spinodal decomposition, with an energy beam having an intensity causing spinodal decomposition-induced phase separation in accordance with the information to be written. Reading of the information, on the other hand, can be achieved by irradiating the recording layer with phase separation caused by spinodal decomposition, with an energy beam having an intensity causing no spinodal decomposition-induced phase separation.

The intensity of the energy beam causing spinodal decomposition-induced phase separation for writing and that causing no spinodal decomposition-induced phase separation for reading may be decided by theoretical calculation from the structure of the medium. For preference, however, the intensity of the energy beam necessary for writing is decided from an experimentally prepared graph of energy beam intensity vs. reflectivity and contrast. More specifically, the energy beam intensity for writing is selected from the range which increases the reflectivity to a level higher than the initial reflectivity by at least 20% and preferably by at least 30%, and of not less than 70% and preferably not less than 75% so as to make a sufficient contrast; and the energy beam intensity for reading is selected from the range which causes no change in initial reflectivity.

Because the optical recording medium of the present invention resembles a CD or LD, it naturally happens that functions as ROM, such as various indices or fixed information, should be added thereto. This being the case, the following means may be taken. Pre-pits for ROM information may be previously made in the substrate at an area apart from that for data writing. The pre-pits are exposed all at once to light having a power causing spinodal decomposition by means of an exposure apparatus or a multitrack writing apparatus to cause spinodal decomposition. Phase separation thus induced by spinodal decomposition increases the reflectivity of the exposed area to 70% or more and preferably 75% or more, conformable to the CD or LD standard.

It is also possible that pre-pits for ROM information may be formed in the substrate sporadically in the area for data writing, and the pre-pits are continuously irradiated with a laser beam having a power causing spinodal decomposition. Phase separation thus induced increases the reflectivity of the irradiated area to 70% or more, and preferably 75% or more, conformable to the CD or LD standard, thereby adding the ROM information to the data area sporadically.

The present invention is now illustrated in greater detail with reference to Examples, but it should be understood that the present invention is not construed as being limited thereto.

EXAMPLE 1

A recording disc having the layer structure of FIG. 1 was produced by using antimony oxide as a recording material.

That is, $SiO_2$ was deposited on substrate 1 made of polymethyl methacrylate (PMMA) or polycarbonate (PC) by sputtering to form lower dielectric layer 2 having a thickness of 1000 Å. On the lower dielectric layer 2 was formed a recording layer 3 having a thickness of 300 Å by radiofrequency (RF) ion plating. $SiO_2$ was further deposited thereon to form 1000 Å-thick upper dielectric layer 4, on which 500 Å-thick reflecting quenching aluminum layer 5 was further formed. Ultraviolet curing resin layer 6 was then laminated on reflecting quenching layer 5 for protection.

Figure 2:
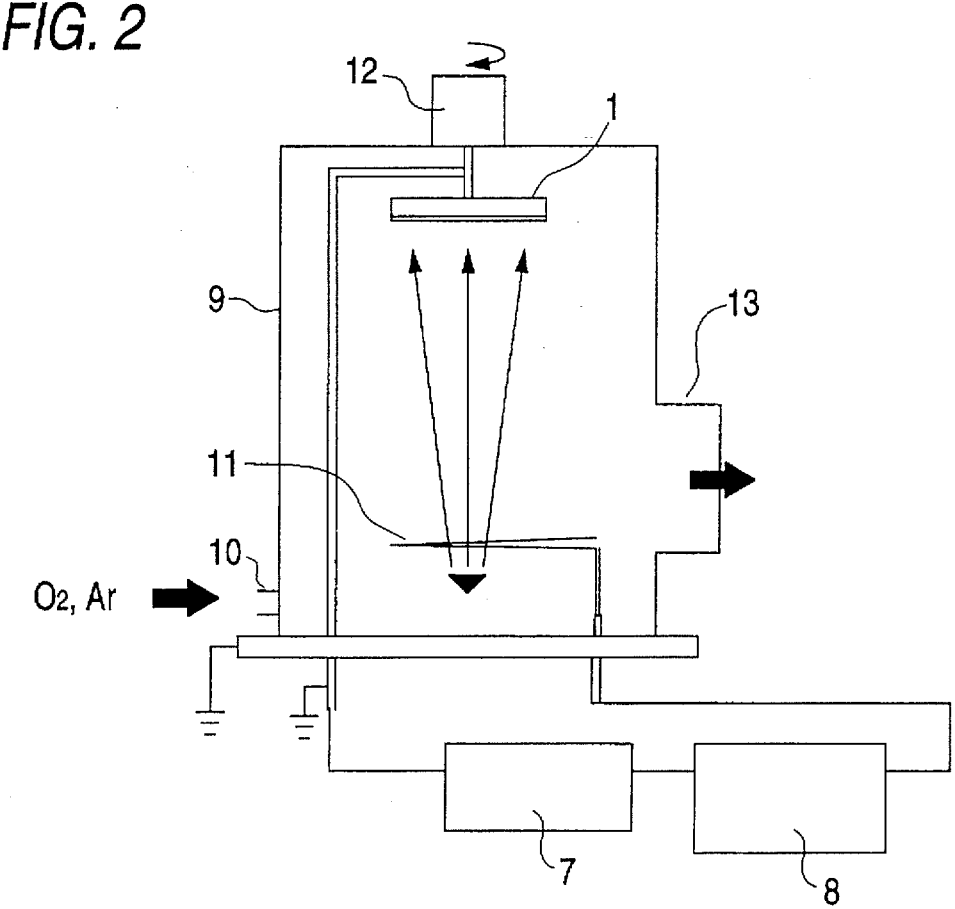
FIG. 2 is a schematic illustration of an ion plating apparatus used for forming the recording layer shown in FIG. 1.

RF ion plating for recording layer 3 was carried out by the use of an ion plating apparatus as shown in FIG. 2. Ion plating chamber 9 is equipped with an RF power source 7 and matching box 8. Argon gas and oxygen are introduced into chamber 9 through gas inlet 10, and an RF power of several hundred watts (W) is applied to RF coil 11 to generate plasma. Antimony is evaporated and ionized by the electron beam and deposited on rotating substrate 1. In FIG. 2, numerals 12 and 13 indicate a motor and an exhaust vent, respectively.

Figure 3:
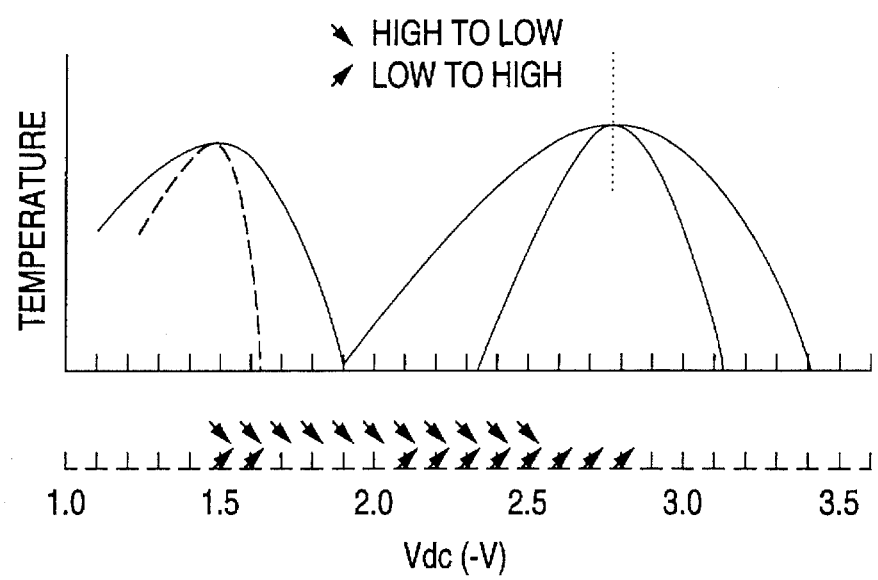
FIG. 3 is a graph showing laser power dependence of the recording mode in the recording disc prepared in Example 1.

While the parameters of film-formation by ion plating mainly include an RF power, an argon gas pressure, and an oxygen gas pressure, the RF power was under control while fixing the argon and oxygen gas pressures at $3\times10^{-4}$ Torr and $6\times10^{-4}$ Torr, respectively. The dependence of the recording mode on Vdc monitored as an indication of laser power was as shown in FIG. 3. The high-to-low (HL) mode corresponds to phase separation due to formation and growth of nuclei (binordal decomposition), and the low-to-high (LH) mode corresponds to phase separation due to spinodal decomposition. As a result, the phase diagram in this case assumed to be as shown in FIG. 3. The region inducing only the LH mode was chosen as a spinodal region, and the film was prepared with the Vdc value falling within this region.

Information was recorded on the thus produced disc medium under the following conditions:

Writing laser power: 5 mW–16 mW

Reading laser power: 2 mW

Number of Revolutions: 1800 rpm

Recorded signals: standard NTSC signals

Figure 4:
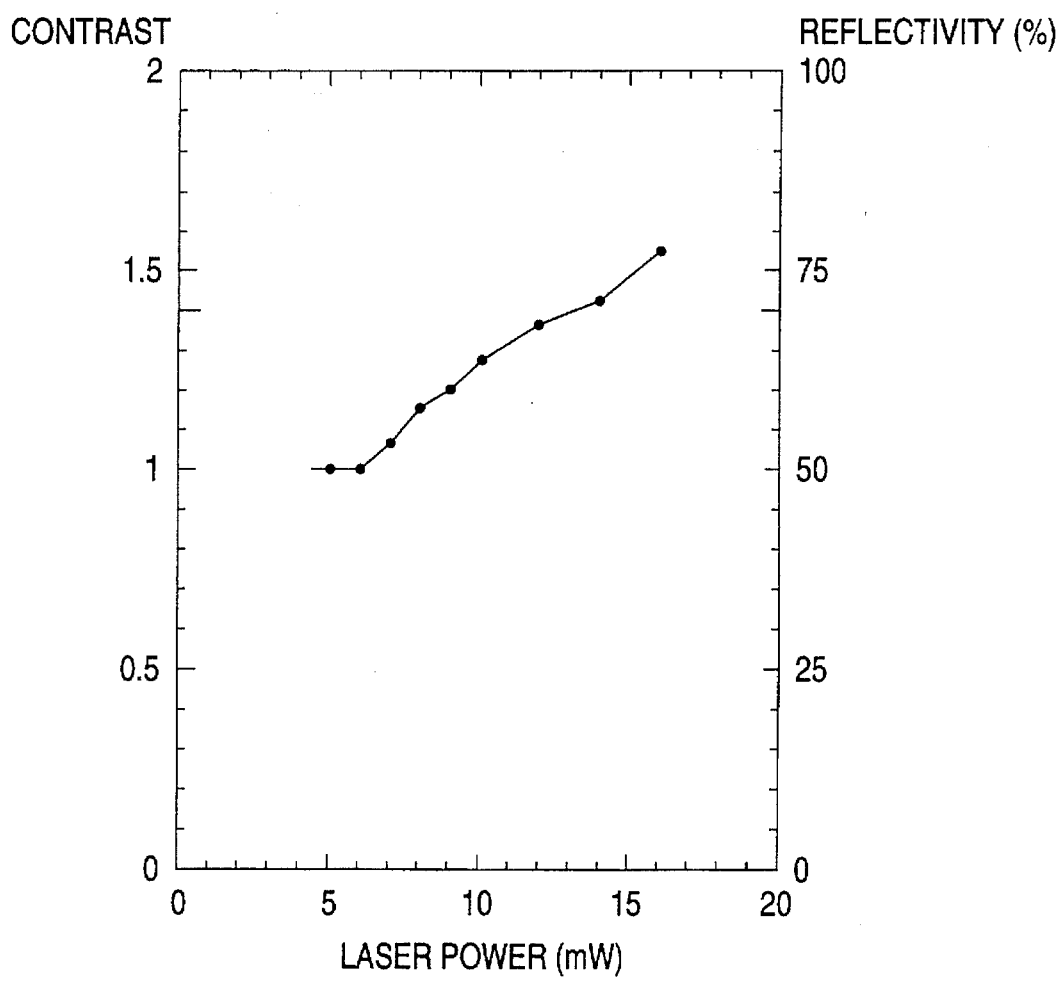
FIG. 4 is a graph showing laser power dependence of the contrast in the recording disc prepared in Example 1.

The disc medium exhibited laser power characteristics (laser power vs. reflectivity and contrast) as shown in FIG. 4 on writing. The as-deposited area had a reflectivity (i.e., initial reflectivity) of about 45% and an absorbance of about 40%, and the maximum reflectivity reached by writing was about 75%. It was thus confirmed that the change in reflectivity satisfies the LD standard on reversal recording of frequency-modulated image signals. Actually, when the NTSC signals were recorded, the S/N ratio was about 48 dB. Further, when an environmental test was conducted under a condition of 50° C., 60° C., or 70° C. at 85% RH for 1,000 hours, no substantial change in reflectivity was observed. When the medium having such recording characteristics was reproduced on a commercially available video disc player, reproducibility was as fine as in the case using commercially available video discs with no problem.

Figure 5:
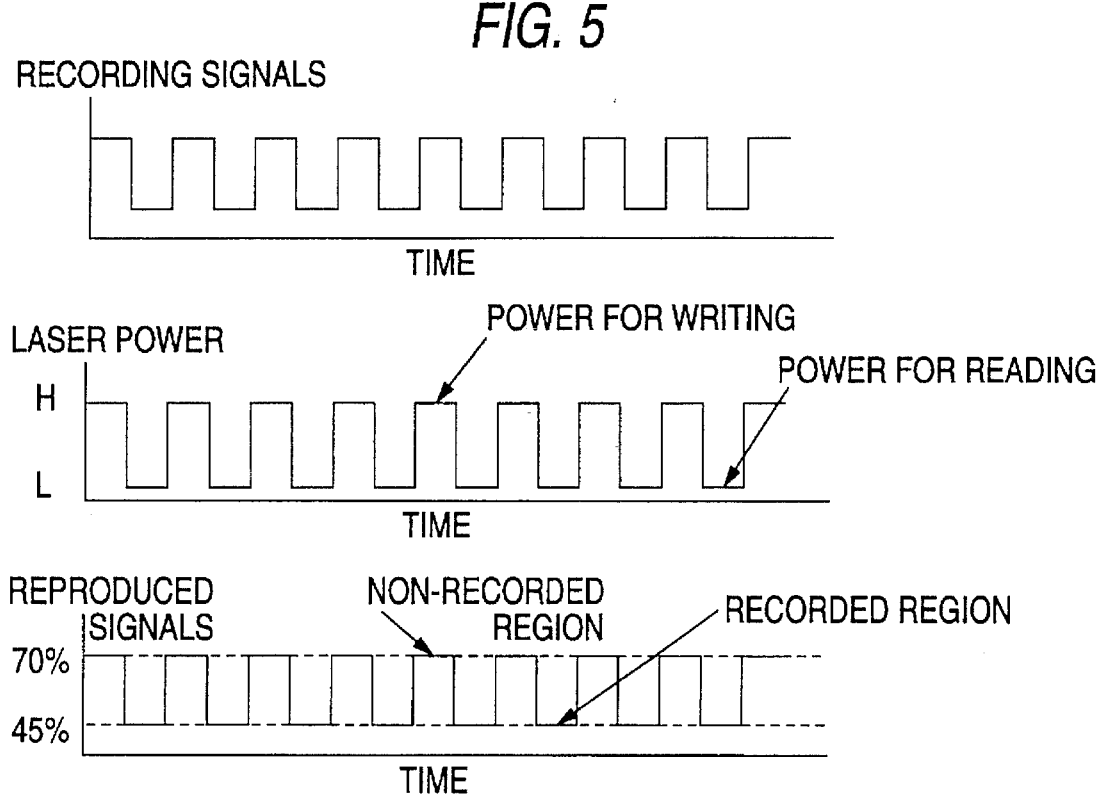
FIG. 5 is an illustration of the transition model of information signals in the optical recording medium according to the present invention.

The transition model of each of the information signals, the writing laser power corresponding to the information signals, and the reproduced signals are shown in FIG. 5.

From these results, it was proved that the object of the present invention can be accomplished by setting the reflectivity at 70% or more in conformity with the CD or LD standard, and recording reversed signals by utilizing spinodal decomposition as a mechanism of an increase of reflectivity.

Figure 6:
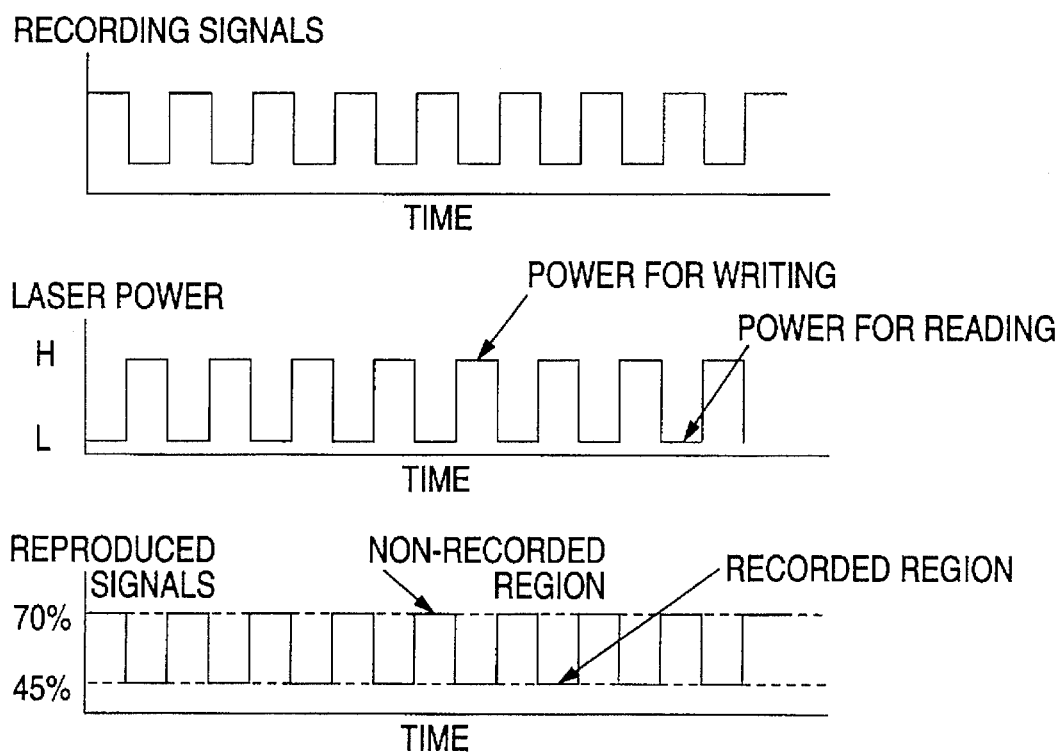
FIG. 6 is an illustration of the transition model of information signals in a conventional recording medium.

For comparison, transition models of information signals in a conventional optical recording medium whose reflectivity at the as-deposited area is set at 70% are shown in FIG. 6. In this case, the absorbance was about 15%, and the medium required a laser power twice or more that used in the present invention.

EXAMPLE 2

Image information was previously recorded as pre-pits on the same medium as produced in Example 1 to make an ROM area within a radius of from 150 to 200 mm. The information recorded was usual NTSC signals, and the pre-pits had the same shape as those of usual video discs. The pre-pits were exposed to light all at once with a xenon flash lamp with the other area being masked. As a result, the reflectivity increased to about 75% or more, which conforms to the standard. The resulting disc was proved useful with its function separated into an ROM area and a WO area.

EXAMPLE 3

The same medium as produced in Example 1 was used with its entire recording area for use as a data area, and part of the tracks thereof for use as an ROM area. Image information was previously recorded as pre-pits in the necessary tracks by scanning each track with a laser beam to induce a HL mode for a ROM image.

EXAMPLE 4

Various recording discs having the layer structure of FIG. 1 were produced by using antimony oxide as a recording material.

That is, $SiO_2$ was deposited on substrate 1 made of PC by sputtering to form lower dielectric layer 2 having a thickness of 800 Å. On lower dielectric layer 2 was formed recording layer 3 having a thickness of about 400 Å by RF ion plating in the same manner as in Example 1. $SiO_2$ was further deposited thereon to form 600 Å-thick upper dielectric layer 4, on which 600 Å-thick metal layer 5 of aluminum was further formed. Metal layer 5 functions to rapidly quench recording layer 3 and to reflect laser beam. Ultraviolet curing resin 6 having a thickness of about 2 μm was then provided on metal layer 5.

In the RF ion plating for recording layer 3, the Vdc value was changed to form various recording layers having different antimony oxide compositions which were determined by Rutherford scattering method.

Each of the thus-prepared recording discs having the different recording layers was irradiated with a laser beam of about 12 mW at the linear velocity of 1.4 m/sec, and the phase state of the recording layer after the irradiation was examined.

Figure 7:
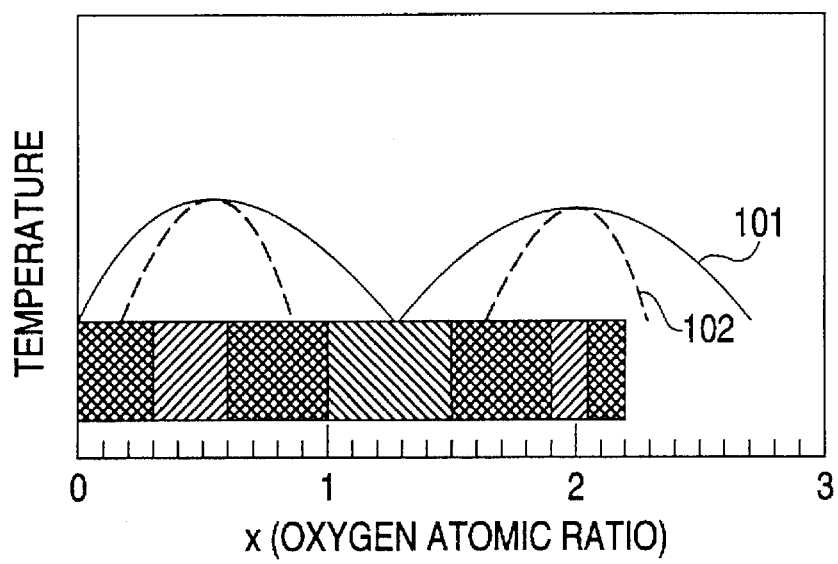
FIG. 7 is a graph showing oxygen atomic ratio (x) dependency of the recording mode in the $SbO_x$ recording layer of the optical recording disc prepared in Example 4.

The relationship between the antimony oxide composition and the phase state of the recording player is shown in FIG. 7, wherein the ordinate represents a temperature of the recording layer and the abscissa represents an oxygen atomic ratio (x) in $SbO_x$ constituting the recording layer. It is seen from the results shown in FIG. 7 that the recording layer of $SbO_x$ undergoes only binordal decomposition when x is within the range of from 1.1 to 1.5 and it undergoes only spinodal decomposition when x is within the ranges of from 0.3 to 0.6 and from 1.8 to 2.1. Within the other ranges, the recording layer undergoes either binordal decomposition or spinodal decomposition depending upon cooling conditions of the recording layer after the laser beam irradiation. The recording layer has an increased reflectivity (higher than the initial reflectivity) at the region where spinodal decomposition took place upon the laser beam irradiation and cooling. That is, the reflectivity changes from low to high in this region, and this change is called "LH mode". At the region where binordal decomposition took place upon the laser beam irradiation and cooling, the recording layer has a decreased reflectivity (lower than the initial reflectivity). That is, the reflectivity changes from high to low, and this change is called "HL mode".

In FIG. 7, both solid line 101 and broken line 102 show the states of antimony oxide and represent a binordal decomposition curve and a spinodal decomposition curve, respectively.

Figure 8:
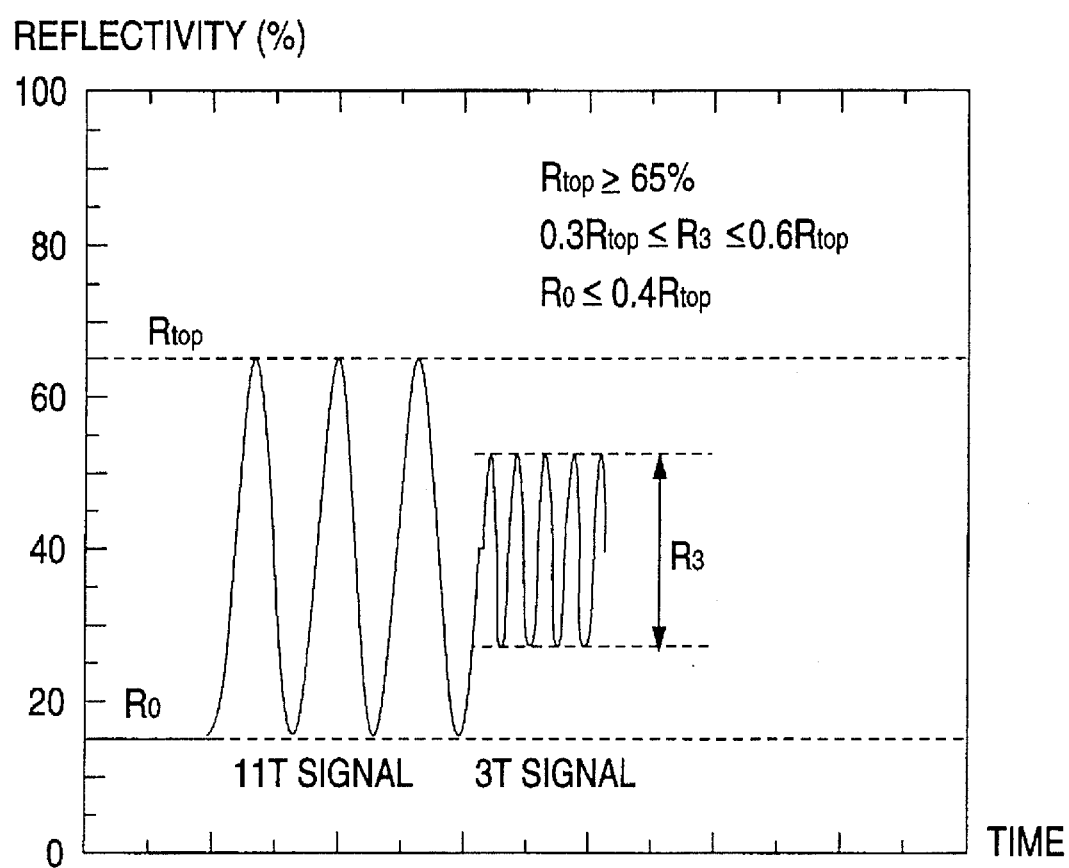
FIG. 8 is an illustration of the current CD format of the WO system.
Figure 9A:
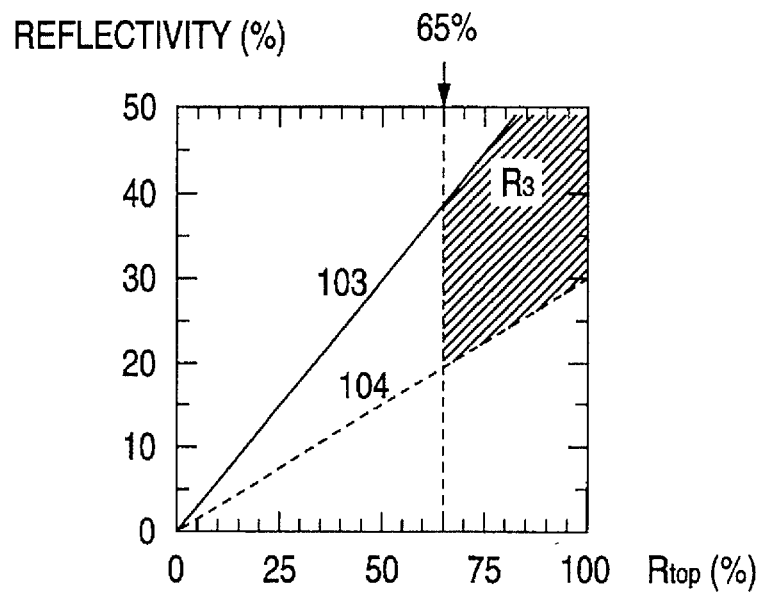
FIGS. 9a and 9b show the current CD format of the WO system in terms of reflectivity.
Figure 9B:
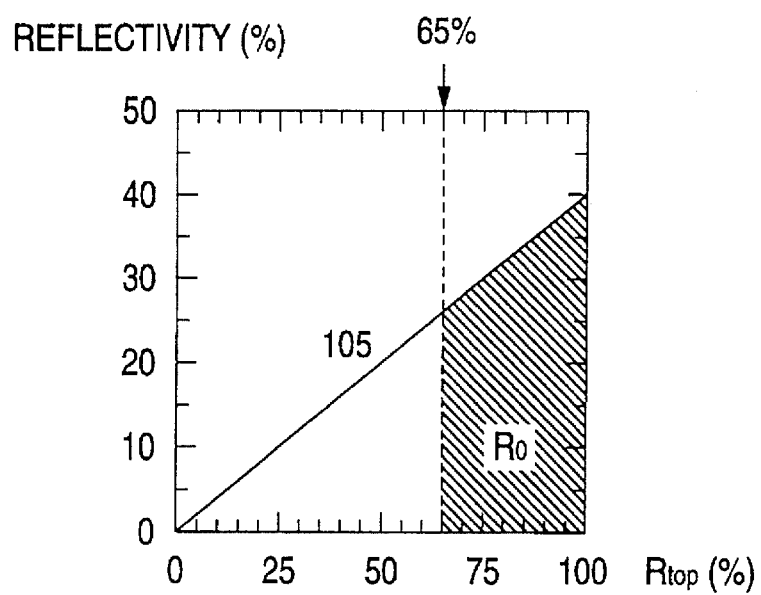

The CD standard of WO system (hereafter referred to as "CDWO standard") is illustrated in FIG. 8, wherein the ordinate represents the reflectivity of a recording medium and the abscissa represents the recording time. According to the CDWO standard, the recording medium is regulated to have a maximum reflectivity ($R_{top}$) of at least 65% at the recorded region irradiated with a laser beam of 196 KHz (11T signal); to have an amplitude of reflectivity ($R_3$) when irradiated with a laser beam of 720 KHz (3 T signal) of 0.3 to 0.6 times that of $R_{top}$; and to have an initial reflectivity ($R_0$) of not more than 0.4 times that of $R_{top}$. FIGS. 9a and 9b also show the CDWO standard in terms of reflectivity, wherein the ordinate represents reflectivity of the recording medium and the abscissa represents $R_{top}$ of the recording medium. Lines 103, 104 and 105 represent $R_3=0.6\ R_{top}$, $R_3=0.3\ R_{top}$, and $R_0=0.4\ R_{top}$, respectively. A recording media according to the CDWO standard must have reflectivity falling within the hatched areas shown in FIGS. 9a and 9b. For example, a recording media having $R_{top}$ of 65% must satisfy the following requirements: $R_0 \leq 26\%$ and $R_3 \geq 19.5\%$.

Using the above-prepared recording disc having a $SbO_x$ recording layer (x: about 2.0) which undergoes only spinodal decomposition regardless of cooling conditions after the layer beam irradiation, a recording test was carried out to examine whether the recording disc accords with the CDWO standard. The test conditions are shown below.

Laser power for writing: 0 to 15 mW, changed by 1 mW

Laser power for reading: 1 mW

Linear velocity of rotated recording disc: 1.4 m/sec

Recording signal: 196 to 720 KHz (duty ratio 50%)

Figure 10:
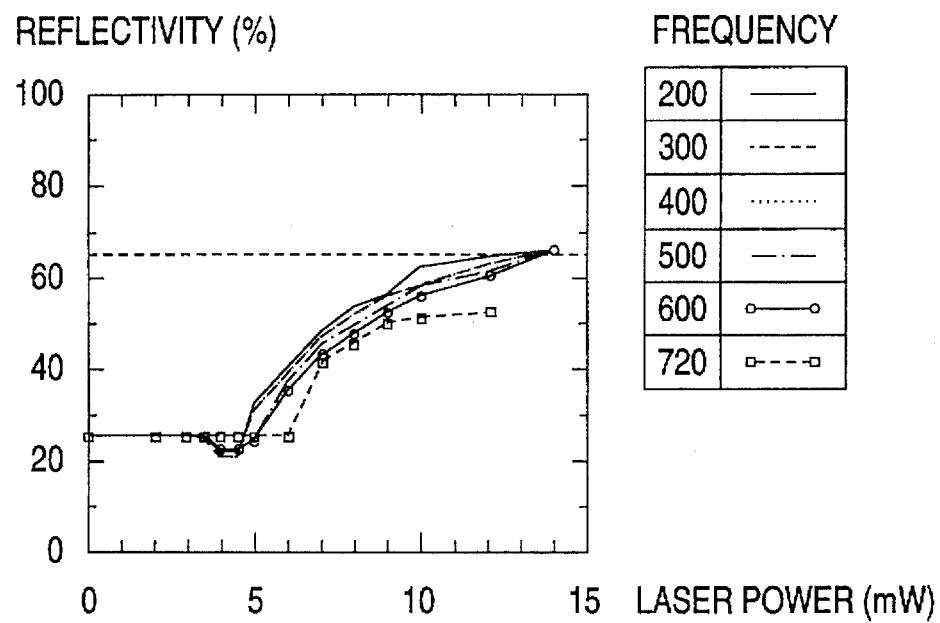
FIGS. 10 to 15 are graphs showing reflectivity characteristics of the recording disc prepared in Example 4.
Figure 11:
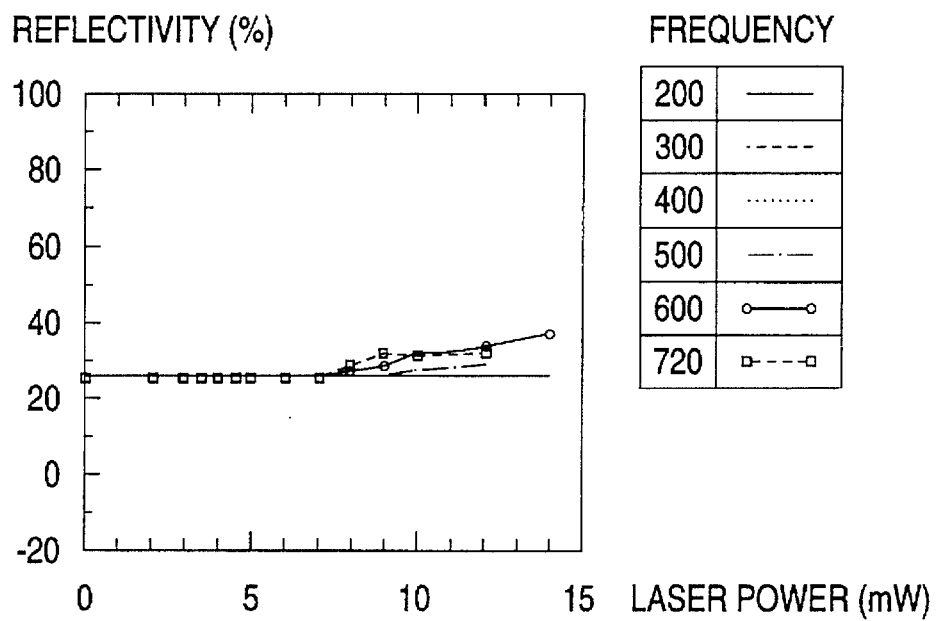
Figure 12:
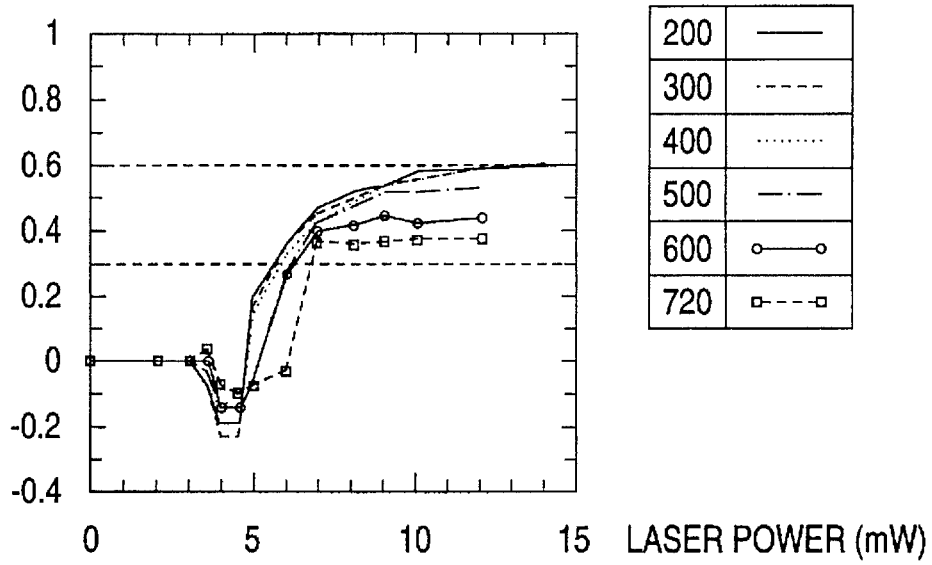
Figure 13:
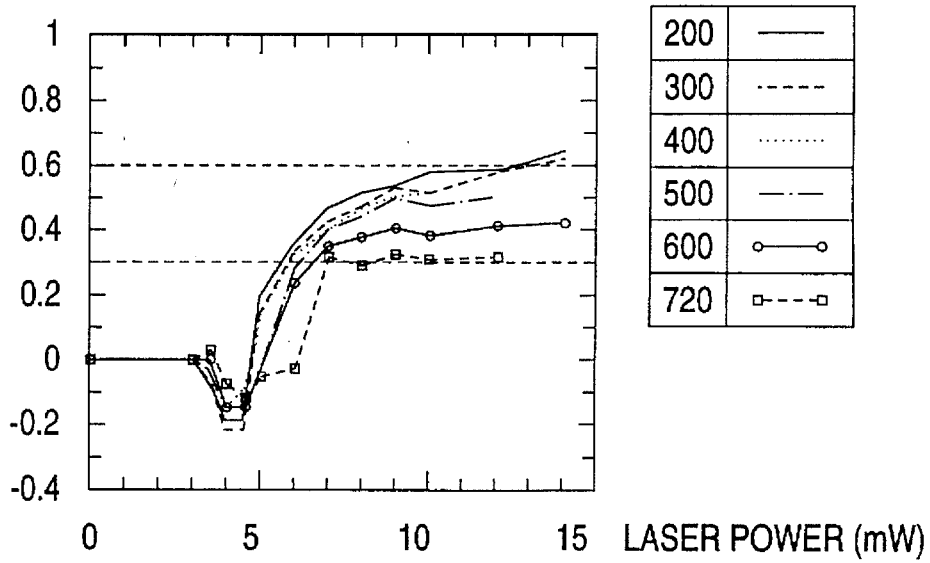
Figure 14:
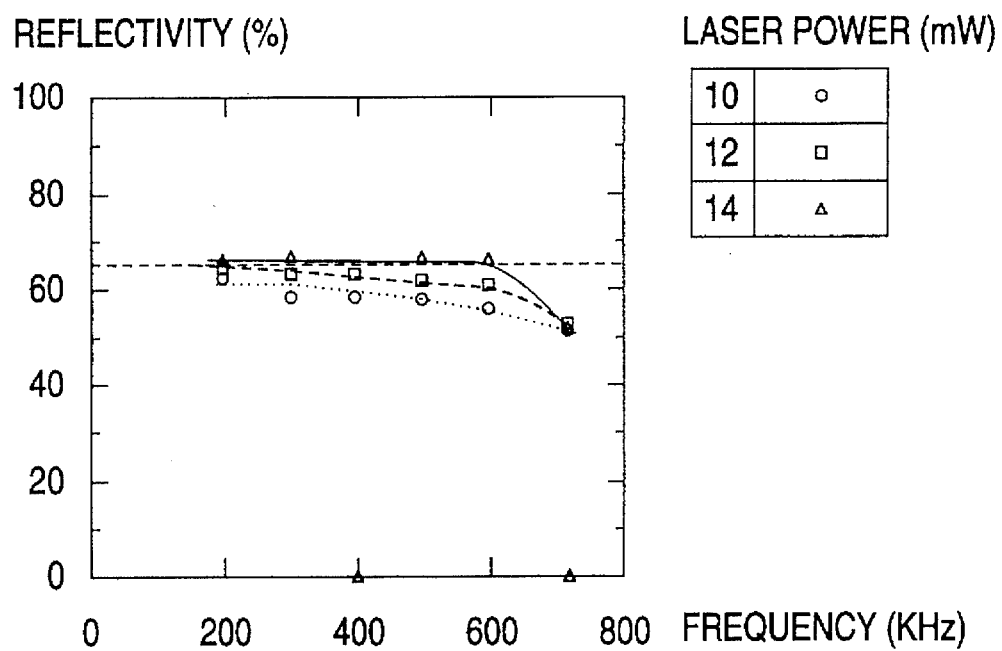
Figure 15:
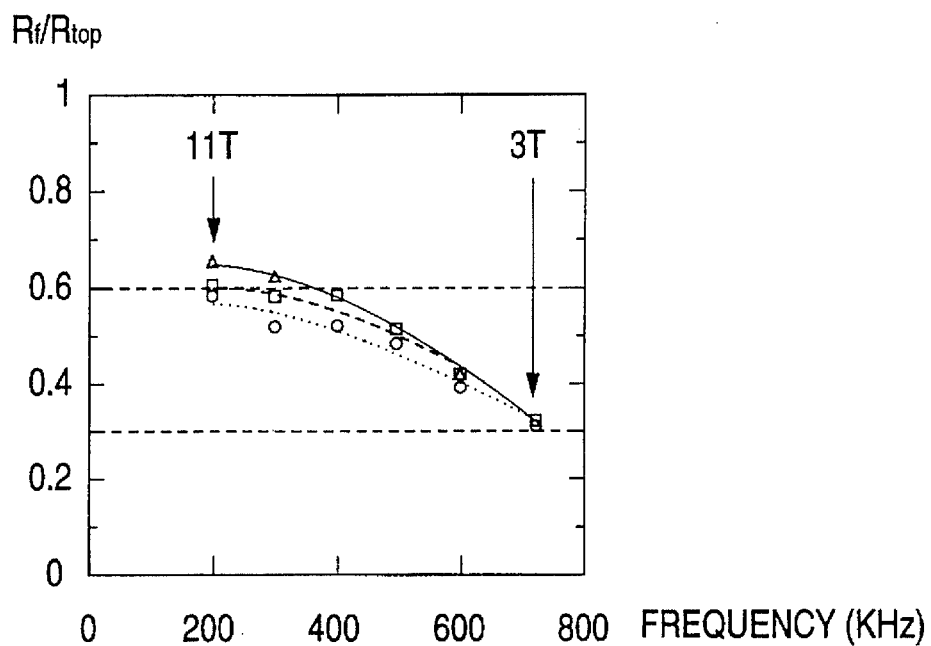

The results obtained are shown in FIGS. 10 to 15. FIG. 10 and 11 are graphs showing change in reflectivity in the recorded regions and non-recorded regions, respectively, of the recording disc. FIG. 12 is a graph showing contrast in reflectivity of the recorded regions and non-recorded regions of the recording disc. FIG. 13 is a graph showing changes in the ratio of amplitude of reflectivity at the recording frequency (f) to the maximum reflectivity in the recorded regions of the recording disc. FIG. 14 is a graph showing recording frequency dependence of the contrast in reflectivity of the recording disc. Further, FIG. 15 is a graph showing recording frequency dependence of the ratio of amplitude of reflectivity at the recording frequency (f) to the maximum reflectivity.

As shown in FIG. 14, the recording disc exhibits the maximum reflectivity ($R_{top}$) of 65% or more at the recorded region irradiated with a laser beam of 196 KHz when the laser power is 12 mW or higher. FIG. 15 reveals that the recording disc has a ratio of amplitude of reflectivity ($R_3$) to $R_{top}$ of 0.31 or more when the recording frequency is 720 KHz and the ratio of 0.61 or more when the recording frequency is 196 KHz. Further, it is seen from FIG. 11 that the initial reflectivity ($R_0$) of the recording disc is 26%. Namely, the recording disc has $R_{top} \geq 65\%$, $R_0 = 26\%$ and $R_3/R_{top} \geq 0.31$, and thus, the recording disc accords with the CDWO standard.

Further, it was confirmed that signals recorded on the recording disc could be reproduced by a commercially available CD-ROM drive, and reproducibility was as fine as in the case using conventional CD-ROM discs. Furthermore, no substantial change in reflectivity was observed even after storage of the recording disc at 50° C., 60° C. or 70° C. and 85% RH for %1,000 hours.

The recording disc forms high reflectivity regions as recording bits due to spinodal decomposition, i.e., the recorded region of the disc has high reflectivity, whereas the non-recorded region has low reflectivity. FIG. 5 shows the relationship of the recording signals, laser power for writing and reproduced signals in the case of using the recording disc of the present invention. Writing on the recording disc is effected with pulse signals having the laser power exactly corresponding to the recording signals such that the laser power is "high" when the recording signal is "high", while writing on an ordinary gold/organic dye-based CD of WO system is effected with pulse signals having the laser power reversely corresponding to the recording signals as shown in FIG. 6 such that the laser power is "high" when the recording signal is "low".

EXAMPLE 5

A recording layer of $SbO_x$ undergoes spinodal decomposition and binordal decomposition depending upon the cooling conditions following the laser beam irradiation when x is within the ranges of 0 to 0.3, from 0.6 to 1.1, from 1.5 to 1.8 and from 2.1 to 2.2, as shown in FIG. 7. When a layer of metal, e.g., aluminum, is provided adjacent to the recording layer, the metal layer quenches recorded portions (irradiated portions) of the recording layer, ensuring spinodal decomposition at the portions. Thus, the above-mentioned recording material can be used for the recording layer of recording discs with the formation of such a metal layer adjacent thereto.

EXAMPLE 6

The recording disc having a $SbO_x$ recording layer (x: about 2.0) as prepared in Example 4 exhibits a reduced reflectivity at the recorded region when irradiated with a low-power laser beam, e.g., having a laser power of 3 to 5 mW, as shown in FIG. 12. The reduction is believed to be because binordal decomposition took place at this laser power range. Utilizing this phenomenon, high contrast of reflectivity can be attained. More specifically, the recording disc is irradiated at least at non-recorded regions with such a low-power laser beam to cause binordal decomposition, whereby the initial reflectivity is lowered at the non-recorded regions, and then the regions are partly irradiated with a high-power laser beam to cause spinodal decomposition to form recorded regions having high reflectivity in the non-recorded regions.

EXAMPLE 7

Image formation was previously recorded as pre-pits on the same medium as produced in Example 4 to make an ROM area within a radius of from 50 mm to 80 mm. The pre-pits were exposed to light all at once with a xenon flash lamp with the other area being masked. As a result, the reflectivity increased to about 75% or more, which conforms to the standard. The resulting disc was proved useful with its function separated into a ROM area and a WO area.

EXAMPLE 8

The same medium as produced in Example 4 was used with its entire recording area for use as a data area, and part of the tracks thereof for use as a ROM area. Image information was previously recorded as pre-pits in the necessary tracks by scanning each track with a laser beam to induce an HL mode for a ROM image.

The present invention makes it possible to obtain a practically useful writable optical recording medium having high sensitivity, high reflectivity, and high contrast. Since writing is effected by irradiating a laser beam on a recording layer having a low reflectivity, the loss of the laser beam due to reflection on writing can be minimized so that efficient use can be made of the energy of the laser beam. The present invention also makes it possible to form a recording layer and other layers on a substrate of CD or LD format through the same or similar processes as those used for creating known WO digital data discs according to ISO standards to provide an optical recording medium useful as a CD or an LD. In particular, the optical recording medium of the present invention achieves real time recording as an LD and is applicable to a broader range. Since the medium of the invention can be reproduced on an ordinary video disc player, it is also useful as a distribution medium of image information.

While the invention has been described in detail and with reference to specific examples thereof, it will be apparent to one skilled in the art that various changes and modifications can be made therein without departing from the spirit and scope thereof.

What is claimed is:

1. An optical recording medium comprising a substrate having hereon a recording layer in which regions having an increased reflectivity are formed by spinodal decomposition of the recording layer upon application thereto of energy above a predetermined threshold value of the electromagnetic spectrum and said recording layer has a maximum reflectivity of at least 65% when the energy of 196 KHz is applied thereto, wherein an amplitude of vibration in reflectivity of the recording layer upon application of the energy of 720 KHz is 0.3 to 0.6 times that of said maximum reflectivity and an initial reflectivity of the recording layer is not more than 0.4 times that of said maximum reflectivity.

2. The optical recording medium as in claim 1, wherein said recording layer has a composition that only undergoes spinodal decomposition upon application of the energy above the predetermined threshold value.

3. The optical recording medium as in claim 1, which further comprises a metal layer provided on said substrate.

4. The optical recording medium as in claim 1, wherein said recording layer is composed of an antimony oxide material.

5. The optical recording medium as in claim 3, wherein said recording layer has a composition that undergoes spinodal decomposition and binordal decomposition.

6. The optical recording medium as in claim 3, wherein said recording layer is composed of an antimony oxide material.

7. The optical recording medium as in claim 3, wherein said metal layer is composed of aluminum.

8. The optical recording medium as in claim 4, wherein said antimony oxide material has a composition represented by $SbO_x$ wherein x is a real number of from 0.3 to 1.1 or from 1.5 to 2.3.

9. The optical recording medium as in claim 8, wherein said antimony oxide material has a composition represented by $SbO_x$ wherein x is a real number of from 0.3 to 0.6 or from 1.8 to 2.1.

10. An optical recording medium comprising a substrate having thereon a recording layer in which regions having an increased reflectivity are formed by spinodal decomposition of the recording layer upon application thereto of energy above a predetermined threshold value of the electromagnetic spectrum, said recording layer composed of an antimony oxide material, wherein said antimony oxide has a composition represented by $SbO_x$, where x is a real number from infinitesimally greater than 0 to 1.1 or from 1.5 to 2.3.

11. The optical recording medium as in claim 10, which further comprises a metal layer provided on said substrate.

12. The optical recording medium as in claim 12, wherein said antimony oxide material has a composition represented by $SbO_x$ wherein x is a real number of from 0.3 to 0.6 or from 1.8 to 2.1.

13. An optical recording method comprising writing and reading information by application of energy to a phase-separable recording layer composed of an antimony oxide material having a composition represented by $SbO_x$, wherein x is a real number from infinitesimally greater than 0 to 1.1 or from 1.5 to 2.3, and provided on a substrate, wherein the writing is effected by applying energy having an intensity above a predetermined threshold of the electromagnetic spectrum in conformity with the information to form recording bits in the form of regions having an increased reflectivity due to spinodal decomposition of the recording layer, and the reading is effected by applying energy having an intensity not to cause spinodal decomposition of the recording layer.

* * * * *